United States Patent [19]

Hutchins

[11] 4,448,039
[45] May 15, 1984

[54] LATENT-HEAT HEATING AND COOLING SYSTEM

[76] Inventor: Robert D. Hutchins, 221 E. Pebble Beach, Tempe, Ariz. 85282

[21] Appl. No.: 419,225

[22] Filed: Sep. 17, 1982

[51] Int. Cl.³ .............................................. F25B 27/00
[52] U.S. Cl. ..................................... 62/235.1; 62/500
[58] Field of Search ............................. 62/235.1, 500

[56] References Cited

U.S. PATENT DOCUMENTS

| | | | |
|---|---|---|---|
| 4,007,776 | 2/1977 | Alkasab | 62/235.1 X |
| 4,173,994 | 11/1979 | Hiser | 62/500 X |
| 4,213,305 | 7/1980 | DeGeus | 62/235.1 |
| 4,248,049 | 2/1981 | Briley | 62/235.1 |

Primary Examiner—Lloyd L. King

[57] ABSTRACT

This disclosure relates to a latent heat solar heating and cooling system which incorporates a low-pressure, flooded evaporator/collector panel in conjunction with a venturi type jet condenser driven by liquid motive force within a remote heat exchanger, to serve as a device to collect, store and transfer energy through changes of state between liquid and vapor phases of a transmission medium, so that efficient energy collection, storage and transfer may be accomplished without the use of electromechanical compression external to the remote heat exchanger.

20 Claims, 2 Drawing Figures

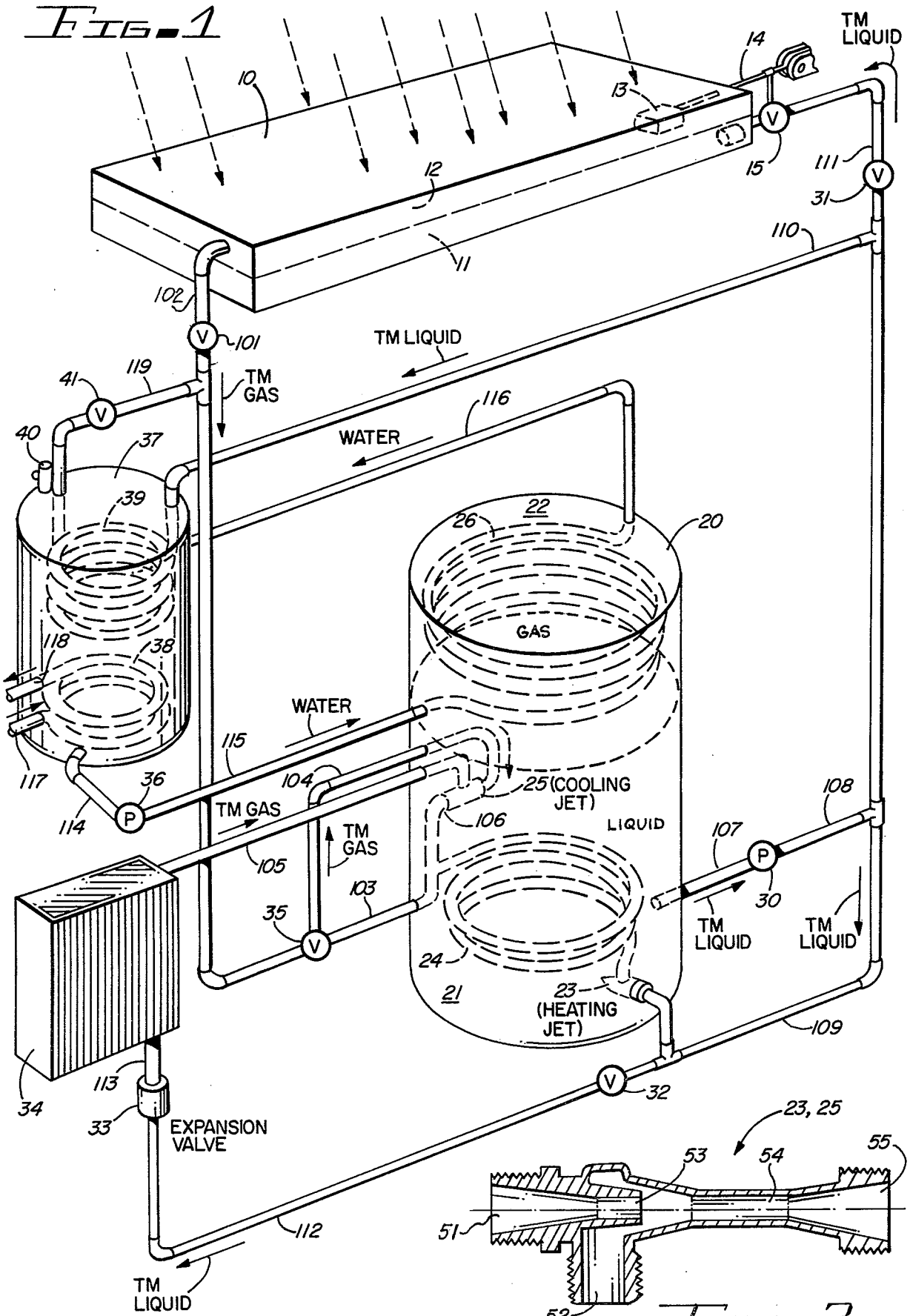

LATENT-HEAT HEATING AND COOLING SYSTEM

BACKGROUND OF THE INVENTION

1. Field of the Invention

This invention relates generally to heating and cooling systems, and more specifically to solar heating and cooling systems for collection, transfer and storage of heat through a change of the liquid/vapor state of a transmission medium.

2. Description of the Prior Art

In the past, non-photovoltaic types of solar heating and cooling systems generally achieved collection, transfer and storage of solar energy either through the change in temperature of a flowing transmission medium which remained in a single liquid or vapor state, or alternatively, through a change in the liquid/vapor state of a flowing transmission medium, acquiring, retaining and remotely releasing the transmission medium's latent heat of evaporation.

The most common such prior art system typically used water as the transmission medium, relied upon the specific heat retention capacity of the transmission medium, and typically required large quantities of the transmission medium to be pumped through a solar collector panel in order that substantial heat transfer takes place.

The above-identified alternative prior art system, in which the more efficient latent heat of evaporation permits a relatively smaller quantity of transmission medium to be pumped through a solar collector, has generally taken the form of "solar-assisted heat pumps". These "solar-assisted heat pumps" are similar in function to conventional heat pumps, in that the solar collector panel served as an evaporator for a compressible transmission medium having a high latent heat of evaporation, such as Freon ® fluorocarbon, wherein a substantial portion of output heat was derived from the electrical energy used in an electromechanical compressor.

In prior-art latent-heat systems, the high pressure liquid transmission medium was usually injected through an expansion valve into a solar collector panel, where the liquid "boiled" or changed state to a gas. The gas was compressed by a conventional mechanical compressor and transmitted to a remote heat exchanger, or "condenser", where heat from the compressed gas was released through the heat exchanger by condensation to a liquid, whereupon the cycle was repeated. In such prior-art latent-heat systems, efficiency was impaired by the occupancy of the solar collector primarily by evaporated gas rather than the denser unevaporated liquid transmission medium.

A substantial portion of the derived heat in such prior art systems came from the relatively costly electrical energy required to operate the mechanical compressor, rather than from the relatively less costly solar radiation. Such prior-art latent-heat-type systems usually incurred substantial heat dissipation within the conventional compressor means, which was ordinarily wasted and not retained as useful delivered heat. Moreover, such prior-art latent-heat-type systems were not amenable to simultaneous refrigeration or cooling of a remote heat exchanger, along with a transfer of solar heat for heating purposes. Such solar-assisted heat pumps required, for refrigeration or cooling purposes that the roles of the solar collector panel and the remote heat exchanger be inverted by a valved reversal of transmission medium flow. Thus, a solar collector panel in such a prior-art system would be required in the refrigeration or cooling mode to become a heat radiator or dissipator which is a mode of operation unlikely to permit efficiency in a solar collector panel upon which solar radiation is impinging.

Prior-art latent-heat type systems usually operated at relatively high pressures, requiring heat exchangers in which the transmission-medium tubing required a small ratio of surface area to volume for mechanical strength and leakage prevention. Consequently, intermediate conduction from the ambient environment to such tubing was necessary through the use of cumbersome, inefficient fins attached thereto.

In prior art latent heat-type systems wherein high-pressure liquid was injected into a solar evaporator, there was no convenient control of the pressure within the evaporator, and hence no convenient control of the temperature within the evaporator at which boiling or evaporation occurred.

A need existed for a latent heat solar heating and cooling system wherein useful heat would be primarily derived from solar radiation, without the wasteful energy consumption of a mechanical compressor.

Another need existed for a latent-heat solar heating and cooling system wherein the ratio of liquid transmission medium to evaporated transmission medium within the solar evaporator would be conveniently controlled to maximize efficiency of solar energy absorption, retention transmission and storage.

Yet another need existed for a latent heat solar heating and cooling system wherein compression, liquification and recovery of latent heat from the transmission medium would not waste or dissipate heat outside the remote heat exchanger.

A further need existed for a latent-heat solar heating and cooling system wherein the role of the solar evaporator need not be reversed from one of solar heat absorption to a less efficient role of dissipation or re-radiation in order to operate in a cooling or a refrigeration mode, and wherein useful remote heating and refrigeration is simultaneously accomplished.

Another need existed for a latent heat solar heating and cooling system wherein efficient heat-exchangers in the solar evaporator have a large ratio of surface area to volume, without danger of leakage or explosion of the transmission medium.

A need also existed for a latent heat solar heating and cooling system wherein the pressure within the solar evaporator and the temperature of transmission medium boiling or evaporation would be conveniently controlled.

Still another need existed for a latent heat solar heating and cooling system wherein full advantage would be taken of the change-of-state of a transmission medium by accomplishing the change-of-state within the solar heat collection means and within the remote heat exchanger.

Yet another need further existed for a latent-heat solar heating and cooling system wherein compression of the transmission medium in a gaseous state would be accomplished without the use of a conventional mechanical compressor, so as to eliminate the energy and heat waste of such conventional mechanical compressor.

Yet a further need also existed for a latent-heat solar heating and cooling system wherein compression of the transmission medium in a gaseous state would be accomplished within a remote heat exchanger, so as to retain all of the heat generated by such compression as useful transmitted heat.

Still a further need existed for a latent-heat solar heating and cooling system wherein cooling or refrigeration would be accomplished simultaneously with the absorption and retention of heat, without reversal of transmission medium flow nor use of the solar collector as a dissipator or re-radiator.

Another need existed for a latent-heat solar heating and cooling system wherein heat withdrawn in the cooling or refrigeration process would be usefully retained or used for desirable heating purposes.

Yet another need existed for a latent-heat solar heating and cooling system wherein the pressure of a transmission medium within tubing, solar collectors and heat exchangers could be low, so as to permit more efficient use of tubing, solar collectors and heat exchangers having a high ratio of surface area to volume.

BRIEF DESCRIPTION OF THE DRAWINGS

FIG. 1 is a functional diagram in perspective form of the latent heat heating and cooling system of the present invention.

FIG. 2 is a sectional view of a jet or venturi means used to create a low pressure by means of a transmission-medium motive force within the remote heat exchanger shown in FIG. 1.

SUMMARY OF THE INVENTION

In accordance with the preferred embodiment of this invention, it is an object of this invention to provide an improved latent heat solar heating and cooling system.

It is a further object of this invention to provide an improved latent heat solar heating and cooling system having means to efficiently absorb, retain, transmit (to a remote location), and store heat from solar radiation.

It is another object of this invention to provide an improved latent heat solar heating and cooling system having means to recover latent heat from a transmission medium without the wasteful energy consumption of a mechanical compressor.

Another object of this invention is to provide an improved latent heat solar heating and cooling system having means for the convenient control of (a) the transmission medium pressure and temperature, and (b) the ratio of liquid transmission medium to evaporated transmission medium within a solar evaporator, so as to maximize the efficiency of solar energy absorption and retention by the transmission medium within the solar evaporator.

Another object of this invention is to provide an improved latent heat solar heating and cooling system having means for the full release of retained latent heat of the transmission medium within a remote heat exchanger, and the consequent elimination of wasted release of retained transmission medium latent heat outside the remote heat exchanger.

A further object of this invention is to provide an improved latent heat solar heating and cooling system having means for simultaneous remote heating and cooling, without reversal of the role of the solar evaporator from that of solar radiation absorption to a less efficient role of dissipation or re-radiation.

Yet another object of this invention is to provide an improved latent heat solar heating and cooling system having means for efficient absorption and heat-exchange within the solar evaporator without danger of high pressure or explosion.

In accordance with one embodiment of this invention, a latent heat solar heating and cooling system is disclosed which comprises a solar evaporator in which a liquid medium such as Freon ® is evaporated into its gaseous state by solar radiation, thereby acquiring latent heat of evaporation, and further superheated in its gaseous state by the solar radiation; a remote heat exchanger coupled to the solar evaporator into which the gaseous, heated medium is drawn by action of a heating jet venturi within the remote heat exchanger, wherein the heating jet venturi compresses the gaseous medium and entrains it into a stream of liquid medium, thereby condensing the gaseous medium and recovering its latent heat and superheat; and wherein other heat exchange means are provided before passing through the heating jet venturi, and additional heat exchange means are provided to transfer the recovered heat from the (FREON) medium to another (water) medium, and a pump which is for providing motive power for the heating jet venturi and for replenishing the liquid medium within the solar evaporator, and/or any other evaporators.

In this first or preferred embodiment of the present invention, the solar evaporator is partially filled with the medium in its liquid state, and the remaining space in the solar evaporator is filled with the medium in its gaseous state. A float-controlled valve admits as much liquid medium as is needed to maintain a desired level and ratio of liquid to gaseous medium in the solar evaporator. An outlet of the solar evaporator, located in the region filled by the gaseous medium, provides a low-pressure evacuation means, so that evaporation occurs at a low vapor pressure, and consequently at a low ambient temperature.

The heated gaseous medium flows from the solar evaporator through a pipe or hose to the remote heat exchanger, wherein the medium releases or adds heat by conduction through a first heat exchange means below a liquid level line within the remote heat exchanger. Thereafter, the gaseous medium is drawn into a vacuum inlet of the heating jet venturi, wherein it is compressed and entrained within a high-velocity stream of liquid medium. The motive force driving the liquid medium is provided by a pump.

The entrained and compressed medium partially condenses within the heating jet venturi. Nearly all remaining condensation occurs upon its discharge from the heating jet venturi into the amount of liquid medium below the liquid level line in the remote heat exchanger. An amount of gaseous medium rises to the surface at the liquid line within the remote heat exchanger and establishes an equilibrium wherein the region above the liquid level line comprises the gaseous medium.

A second heat exchange means within the gaseous medium region above the liquid level line of the remote heat exchanger conducts heat from the gaseous medium to another medium, such as water, for transfer and use elsewhere.

The pump provides liquid delivery only, and does not internally do the work of gaseous compression, but rather recirculates the liquid medium from the liquid region within the remote heat exchanger to a motive inlet of the heating jet venturi and to the evaporators.

In accordance with one variation of the preferred embodiment of this invention as generally described above in the first embodiment, the other medium such as water, to which heat is conducted within the remote heat exchanger is stored in a heat storage reservoir, such as a hot water tank, and such heat is withdrawn from the heat storage reservoir either by conduction to yet another medium through another heat exchanger, or by direct withdrawal of the heated second medium within the heat storage reservoir. Waste disposal means coupled to the heat storage reservoir permits venting of the excess heat.

In accordance with yet another variation in the system of this invention as generally described above in the first and second embodiments, a second cooling jet venturi is interposed within the remote heat exchanger between an inlet from the heated gaseous medium region of the solar evaporator and the first heat exchange means. Gaseous medium flowing into a motive inlet of the cooling jet venturi provides a vacuum or low-pressure region at a vacuum inlet of the cooling jet venturi. A cooling evaporator having an outlet coupled to the cooling jet vacuum inlet provides means for evaporating liquid medium contained within the cooling evaporator, thereby cooling a desired area, while adding latent heat to the liquid medium within the cooling evaporator. Heated gaseous medium drawn from the cooling evaporator into the vacuum inlet of the cooling jet venturi is entrained and compressed by action of the motive force of the heated gaseous medium drawn from the solar evaporator, and the entrained combination is discharged into the first heat exchange means of the remote heat exchanger and thereafter into the heating jet venturi. Thus, heat derived from cooling a desired area is usefully added to recovered heat within the latent heat solar heating and cooling system. Liquid medium within the cooling evaporator is replenished through an expansion valve by diversion of liquid pumped to the heating jet venturi.

In accordance with yet another variation in the system of this invention, as described above in the first, second and third embodiments, an amount of liquid medium from the liquid region of the remote heat exchanger is pumped into another heat exchanger within the heat storage reservoir, where it acquires latent heat of evaporation from the stored second medium, and having thus been evaporated, is drawn as a gaseous medium into the remote heat exchanger by the same means as the gaseous medium is drawn from the solar evaporator. Thus, means is provided to operate the cooling evaporator at night or when there is insufficient solar radiation for evaporation within the solar evaporator.

In all of the above embodiments variations and modifications, valves are provided to restrict or close off the hoses or pipes communicating with various parts of the latent heat solar heating and cooling system so as to provide means for optimizing pressures, and flow rates, and to close off portions of the system which are not needed in any given mode of operation. Because of the pressures at which all of the above embodiments variations and modifications operate, thin-wall, conductivity-efficient heat exchangers may be employed without danger of explosion of the medium.

The foregoing and other objects, features, achieved solutions and advantages will be apparent from the following, more particular, description of the preferred embodiments of the present invention, as illustrated in the accompanying drawings.

DETAILED DESCRIPTION OF THE DRAWINGS

Referring to FIG. 1, a solar collector or evaporator panel 10 is shown wherein a lower liquid portion 11 contains a liquid transmission sodium, such as Freon ® in its liquid state, and an upper (gas) portion 12 contains the same transmission medium in its gaseous state. Although the solar evaporator or collector 10 is shown depicted in a horizontal configuration, it may be more desirable to either tilt the evaporator panel 10 to be better impacted by the solar radiation which often comes at an angle or it may be desirable to reconfigure the interior of the evaporator 10 to have the line between the gas and liquid contained therein selective to be an angle which will provide maximum absorbtance. A liquid heat-exchange medium or liquid transmission medium (TM) is admitted to the solar collector from liquid inlet type hose or pipe 111, and is restricted by valve 15, coupled to float 13 (located within the solar evaporator 10), and by level control linkage 14, such that the valve 15, is closed when the ratio of the gas in the gas portion 12, to the liquid in the liquid portion 11 within the solar evaporator panel 10 reaches a desired value.

Low pressure is maintained in the gas within the gas portion or space 12 by means of a gas outlet pipe hose, or tube 102, and the gas outputed or supplied from the upper gas portion of space 12 is controlled by valve 101, through which gaseous medium is evacuated from the solar evaporator 10. In the first embodiment, the pipe or hose 102 communicates directly through inlet pipe 103 with a first heat transfer or heat exchange coil or means 24 within a remote heat exchanger 20. The gaseous medium from the gaseous portion or space 12 is changed in temperature/pressure by conductive contact between the first heat transfer means 24 and a liquid heat exchange medium within the heat exchanger tank 20 in the liquid region 21 located within the heat exchanger 20.

Gaseous or partially condensed heat exchange medium from the first heat exchange means 24 is drawn into a suction inlet of heating jet venturi 23. Referring to FIG. 2, the internal construction of the heating jet venturi 23 may be more readily seen, wherein a high velocity liquid or gas is propelled into motive inlet 51 through a structure in nozzle 53 providing thereby a vacuum or low pressure region in suction chamber 52. Gaseous medium drawn into the suction chamber 52 is compressed and entrained with the high velocity liquid flowing through nozzle 53 and within region 54, and the entrained combination is discharged through discharge outlet 55 into the liquid heat exchange medium region 21.

Referring again to FIG. 1, liquid heat exchange medium is withdrawn from the liquid medium region 21 through pipe or hose 107 from the remote heat exchanger 20 by pump 30, and pumped through pump outlet pipe 108 and heating jet inlet pipe 131 to the motive inlet 51 (FIG. 2) of the heating jet venturi 23. The gaseous medium with the coil 24 is entrained within the liquid heat exchange medium in the inlet pipe 131 and the entrained gaseous medium is discharged through discharge outlet 55 of heating jet venturi 23 into the liquid heat exchange medium in region 21, where the latent heat of evaporation of the entrained gaseous medium raises the temperature of the liquid heat exchange medium in region 21.

A second liquid medium, such as water, is pumped into the upper left side portion (as shown in FIG. 1) of the heat exchanger 20) by water pump 36 through inlet hose tube, or pipe 115 and into a heat exchange coil or means 26 located in the upper portion of the heat exchanger 20 and within a gaseous medium region 22 of the remote heat exchanger 20. This heated second liquid medium thereafter flows to another location by means or through outlet hose or pipe 116 for other uses as hereinafter described.

Another portion of the liquid drawn from the region 21 of the remote heat exchanger 20 is pumped by the pump 30 through the liquid outlet pipe 107 and the pump outlet pipe or tube 108 and through valve 31 into the solar collector liquid inlet pipe or hose 111 to replenish liquid medium boiled or vaporized to form a gas within the solar evaporator panel 10.

In another variation or modification of the preferred embodiment incorporating many or all of the features heretofore disclosed and still referring to FIG. 1, the second heated liquid (water) medium from the heat exchange coil 26 is pumped through the outlet hose or pipe 116 is discharged into a heat storage reservoir 37, and withdrawn therefrom through hose or pipe 114 by pump 36. A third liquid medium, such as water, enters another heat exchange coil or means 38 through hose or pipe 117, is heated therein by the second liquid medium contained within the heat storage reservoir 37, and exits the heated third liquid medium through hose or pipe 118 to a location for subsequent use, as known in the art.

In yet another variation or modification of the preferred embodiment, incorporating many or all of the system components heretofore described, liquid medium from the region 21 of the remote heat exchanger 20 is supplied through the hose or pipe 109 and is at least partially diverted through valve 32 and into hose, or pipe 112. Pipe 112 supplies the liquid medium into expansion valve 33. After expansion by the expansion valve 33 into fine liquid droplets the remaining liquid medium passes through inlet 113 into a space cooler or cooling evaporator 34 where the remaining liquid medium is evaporated by conduction from a desired area, thereby cooling the desired area, and adding latent heat of evaporation to the gaseous medium. Thence, the heated gaseous medium is drawn from the cooling evaporator 34 through hose or pipe 105 into a suction inlet of a cooling evaporator 34 and through hose or pipe 105 into a suction inlet 52 of a cooling jet venturi 25 having a physical construction comparable to the heating jet venturi described above with reference to FIG. 2. Valve 35 diverts all or part (as desired) of the heating gaseous medium flowing in the hose or pipe 102 into and through hose or pipe 104 into a motive inlet 51 of the cooling jet venturi 25, where entrainment and compression between the two gases thereafter occurs within the suction chamber 52 of the cooling jet venturi, and the resulting combined gaseous medium is discharged through discharge outlet 106 to flow through the first heat exchange coil or means 24. Thus, it may be seen that heat withdrawn from a desired area by cooling evaporator 34 is retained usefully within the latent heat solar and cooling system.

In still another variation of this invention, incorporating many of the features heretofore described, a portion of the liquid medium withdrawn from the liquid region 21 at the bottom of the heat exchanger 20 through the hose or pipe 107, by the pump 30, and through pipe 108 from whence it is pumped through the hose or pipe 110 to another heat exchange means 39 within the heat storage reservoir 37, wherein the liquid medium evaporates through conductive contact with the heated second liquid medium stored within the heat storage reservoir 37, thereby acquiring latent heat of evaporation. The resultant gaseous medium is drawn, into and through valve 41 through hose or pipe 119, and on through the hose or pipe 102 downwardly to the valve 35. Thus, it may be seen that heat stored in the heat storage reservoir 37 may be used to supply gaseous medium to provide motive power to the cooling jet 25 through pipes 103 and/or 104 even at night or when there is insufficient solar radiation impinging upon the solar evaporator 10. Pop-off or safety pressure valve 40 provides a safety means for venting excess pressure build up in the reservoir 37.

The heat exchange fluid medium is preferrably a compressible gas such as FREON ® or the like contained in the upper gas fluid storage portion 22 of a relatively small remote heat exchanger tank 20. External connections which include relatively small diameter tubes or pipes 109, 110, 111, and 112 are connected from the pipe outlet via tube 107, pump 30, and tube 108 for carrying the liquid form or state of the fluid medium to the heat collection sources such as the solar collector 10 and the cooler evaporator 34. These tubes 109, 110, 111, and 112, while carrying heat exchange liquid, are subject to a vacuum being applied at the outlet tubing of the heat collection components such as the collector panel 10 and the cooling evaporator 34. All of the tubes or pipes may be insulated to prevent unwanted heat pickup at the tubing, as known in the art.

An additionaly external connection may be established from the heat reservoir tank 37 through the supply and return tubing 118, 117 from "end use" components, not shown, but well-known in the art, which could be storage tanks or the like. This is part of a closed-loop system independent of the remaining portions of the system and the heat exchange fluids may be different for the "end use" desired. The supply and return tubing 118, 117 is connected to a heat exchange coil 38 within the heat exchanger/storage tank 37. The heat exchange is facilitated in the remote heat exchanger 20 by a spray from the discharge port of a heating jet with the vapor condensing and falling back as liquid while making contact with other internal parts to serve an internal heating or cooling function. This dual function conditions the gas/liquid combination in the internal components of the heat exchanger 20 so that it is stable in reference to pressure/temperature relationships of the main liquid/gas body.

In operation, the pump 30 sucks the heat exchange liquid medium contained in the heat exchanger tank 20 and discharges it through tubing 107, 108, 109, 110, 111, 112 to the external collection components 10 and 34 and to the motive and/or port 51 of the heating venturi jet 23. This jet is modified to transfer heat added by the pump work to the main liquid body prior to its entrance into the normal cone and orifice area. The jet operation is conventional. The discharge goes into the spray mentioned above and the velocity of the liquid through the jet provides an entraining action which produces a vacuum at the suction port 52 of the heating jet 23 which is transferred through a pre-cool/heat coil 24 to the discharge port 106 of the cooling jet 25.

Therefore, a continuous vacuum is available and is applied simultaneously to the suction port of the cooling jet 25 and to the motive port 51 of the cooling jet 25 with the different volume capabilities due to the different diameters of the inlet areas result in the main volume capability being in the suction port 52. However, since the vacuum must be the same, it is transferred through the discharge tubing of the various heat collection components 10, 34, as previously described.

The solar collector 10 has been fed by the heat exchange liquid medium, as previously described, and is now full of liquid to a pre-set level controlled by a float valve system or similar functional means. It is not under pressure but stable at those temperature conditions. The outlet tube 102 is under a vacuum condition and the fluid will boil and the collector panel 10 will refill down to the temperature limitations of the vacuum level. Since the same vacuum is applied to all other sources, the efficiency of the collector 10 operating under vacuum conditions becomes dramatically increased. At zero vacuum, water boils at 212 degrees Fahrenheit. Under pressure conditions, as used in most other systems, it boils at a much higher temperature. However, at 28 inches of vacuum, water will boil at 100 degrees Fahrenheit, R-10 at 40 degrees Fahrenheit, and R-11 at −32 degrees Fahrenheit. This means, where a collector panel 10 is continually under a vacuum condition, that it is operating at much greater efficiencies and particularly so in the range below ambient air temperatures. Thus there is a leveling factor of heat input to the system and the capability of pickup from residual solar (ambient) heat is increased.

As the collector panel 10 receives more solar input, vapor or gaseous volumes increase. The vapors go through the discharge tube 102 to the modified precompression with liquification and heat transfer cooling jet and form the liquid motive fluid of the cooling jet 25. This movement through the jet 25 produces the vacuum at the suction port 52 and the discharge of that jet 25 at the nozzle outlet 55 is into a vacuum.

The work of compression, done internally in the heat exchanger, is caused by the solar heat as is the fluid movement, and as is the resulting vacuum at the suction port 52. Thus, in this system, this kinetic energy does most of the work.

With the constant vacuum established at port 52, the discharge port 56 of the cooling jet 26 transfers to the suction at the discharge of the evaporators 34 or collectors 10. As solar collection increases, vapor pressure, prior to entry into the jet 25, increases, due to decreased efficiency of collection, and the speed of compression and liquification increases as does movement through the jet 25. But, the suction pressure for cooling which is the sum of the two functions, remains relatively steady. It is functional at any temperature which is a positive feature of the present invention.

While the system of the present invention has no true condenser to waste heat, there is a somewhat comparable partial function. All-cooling jets discharge into back pressures totally dependent on condenser temperatures. These pressures are above the stated operating temperatures of the condenser and represent vapor pressures. The fluid outlet from the solar collector 10 at tube 102 is a lower temperature gas. As the gas compresses and condenses, it gives off heat within the heat exchanger 20 prior to entry into the motive jet orifice 51. It then moves through the jet 25 at relatively high velocity, entraining gases at the suction port 52 of the jet 25 from space cooling or other solar collectors and this combined or entrained fluid medium goes out the discharge port 55 of the cooling jet 25, is conditioned in both temperature and pressure by a pre-heat/cool coil 24, and appears at the suction port 52 of the heating jet 23.

It is at the heating jet 23 where the gases are entrained with liquid moving through the heating jet 23 and the two fluids mix and are discharged from the discharge port 55 in a spray which engulfs the end use transfer coil 26 in the top portion 22 of the heat exchanger tank 20. Here, the spray again liquifies and returns to the bottom of the tank 20. As the spray falls, it conditions various other components, either heating or cooling them, as needed, so that incoming fluids approach the temperature of the main body of liquid in the remote heat exchange tank 20. These cycles within the remote heat exchanger tank 20 can be and are reversible functions as many components, dictated and implemented automatically by varying input fluid conditions to adjust the fluids to a point in temperature and pressure approaching the end pressure/temperature which is that of the main liquid/gas body.

The heat accumulated in the remote heat exchanger 20 is transferred to the end user or end use, such as storage, either through natural passive means or by an active subsystem, depending on the particular end use requirements. The coil 26 for end use purposes is located in the top portion 22 of the remote heat exchanger tank 20 and would be part of a closed loop subsystem. The balance of such a closed loop subsystem is external to the remote heat exchanger tank 20 and the subsystem can be used for whatever end use is desired.

While not required for the particular end use in mind, if space cooling were the only end use, the coil 26 in the top space 22 of the remote heat exchanger tank 20 could be used much the same as are condensers in various other prior art systems, i.e. as part of a system to dissipate heat. In the present case, however, it is not used in this manner, but the heat goes into storage.

The purpose of the overall design of the system of the present invention is to collect heat. Space cooling due to the availability of heat collection at low temperatures is a simultaneous feature or side effect and is a positive feature of the present design, with the vacuum capacity applied thereto being the sum of the two capabilities, of which one could be zero. In normal dual heat collection usage, the work accomplishing fluid movements through the cooling jets 25 is mainly from the acquired solar energy. The pump does not do this work. The function of the pump is to provide a pressure differential thus permitting the needed velocity through the jet to occur with much lower collector pressures and temperatures, resulting in much greater efficiencies. A continuous vacuum is applied at the suction port of the cooling jet and can be applied, as in the present invention, to any heat source such as the cooler evaporator unit 34, and the like, and even to other solar collectors. Space cooling is simply a particular illustration chosen to represent the versatility of the system.

The present system is actually a "drainback" system with modifications, as shown in the drawings. The solar collector 10 operates in a flooded mode with liquid contained within the solar collector 10 up to a pre-set level which is controlled by a float valve assembly. The term "drainback" is used simply to mean that the fluid medium always returns to the supply area, in the present example the remote heat exchanger tank 20, when the pump is shut off. In a typical freon system, when the pump is shut down, the freon will seek the coldest part of the system and if that area changes, so does the location of the collection area of the fluid.

The solar collector 10 of the present invention is preferably flooded with a freon liquid. The freon movement will not take place unless heat is added to that point through the solar or radiant energy input or if heat is subtracted at another point in the system as by ambient air conditions or the like, as known in the art. Thus, the movement of the liquid medium from the solar collector 10 to the remote heat exchanger tank 20 will normally occur and vice-versa according to component temeratures and usually at less than atmospheric pressures.

It will be recognized that water could be used as the liquid medium throughout the system and also in the solar subsystem but it has the disadvantage of high boiling points and large vapor volumes.

The operation of the total system under vacuum conditions is quite unique and allows far greater efficiency than any heretofor achieved by prior art systems. Heat collections are simple functions whether for cooling use or for heating purposes. The separate injector for heat gathering purposes does not substitute for a mode change as known in the art since the present invention does not have a mode change. The purpose for the separate ejector, termed a heating jet 23, is to drive the collected heats to the storage coil while providing a usable internal vacuum used normally with another vacuum from solar operation to provide a relatively constant vacuum of a range suitable for space cooling or much enhanced efficiency of solar collection. The jets also provide a residual solar collection capability from the ambient surroundings and the improved collection efficiency is due to the vacuum condition or mode of operation of the system. While the heating jet is simply a jet, the function is multiple and they vary as conditions change and self-adjusting changes occur in response to input conditions. Since the heating jet 23 is a simple venturi-type device, and since its functions are different than any previously used in the related arts, the condenser can be eliminated. Since condensers are major sources of and designed to waste heat, up to 75% of the total collected heat, their elimination greatly enhances the efficiency of the system. Furthermore, since small temperature changes at the condenser result in major changes in the cooling capacity for space cooling, even further inefficiencies are introduced in systems utilizing conventional condensers.

The heating jet 23 of the present invention utilized a liquid medium as a motive fluid and maximizes a vacuum of about 28.5 inches of mercury, varying downward as inputs vary, but always producing a vacuum throughout the system. While no vacuum is necessary to provide a lower temperature, the preferred embodiment of the present invention always utilizes a vacuum so that waste heat is captured and efficiency is greatly improved. Further, conventional flat plate collectors require high storage temperatures necessary to provide the high pressure needed for a cooling mode of operation and the efficiency curve of such collectors results in very little heat collection, but mostly waste at high operating temperatures.

The only active components in the present system are the small fractional horsepower pumps which may serve one or many collectors, cooling evaporators, storage tanks, heat exchanger tanks and the like. The pumps serve to move the liquid volume to collectors in change of state systems, the small fractional horsepower pumps provide additional energy-saving features. The fact that a liquid medium is the state supplied to the solar collector while a vapor state is supplied out of the collector, and that a liquid state is supplied to the jet provide still additional efficiencies. Heat collection is positive at relatively all temperatures, being induced by the pump when solar energy is inefficient, and with a transfer of internal component functions when the solar collection capacity is high. However, at all times, the solar heat collection is enhanced and the collector pressures remain lower for increased efficiency.

While the present invention has been particularly shown and described with reference to the preferred embodiment and variations thereof, it will be understood by those skilled in the art that the foregoing and other changes in form and details may be made therein without departing from the spirit and scope of the invention which is limited only by the appended claims.

What is claimed is:

1. A method for collecting, transferring and storing energy through change-of-state between liquid and vapor phases of a heat exchange transmission medium comprising the steps of:

pumping a heat exchange medium in its liquid state into a solar evaporation means;

irradiating said solar evaporation means with solar radiation to evaporate the heat exchange medium from its liquid state into its gaseous state within said evaporation means to add latent heat to said heat-exchange medium, and to add superheat to said medium in its gaseous state;

maintaining said evaporation means under a predetermined lower pressure condition to reduce the boiling point of said evaporating heat exchange medium and increase the efficiency of the method;

evacuating said heat exchange medium in its gaseous state from said solar evaporation means by vacuum-induced suction into a remote heat exchanger for the recovery of said latent heat and said super heat therefrom;

transferring the latent heat of said heat exchange medium within said remote heat exchanger to said heat exchange medium in its liquid state; and spraying said heat exchange medium through a venturi jet means for compressing and condensing said heat exchange medium from said heat exchange medium's gaseous state to its liquid state.

2. The method of claim 1 further including the steps of:

providing motive force to said venturi jet means within said remote heat exchanger means by pumping said medium in its liquid state through a motive inlet and nozzle of said venturi jet means, thereby creating a low-pressure area surrounding said venturi jet means;

drawing said heat exchange medium in its gaseous state into a suction chamber of said venturi jet means by said low-pressure area surrounding said venturi jet means, for providing low vapor pressure within said evaporation means and for providing circulation of said heat exchange through said latent heat heating and cooling system;

entraining and compressing said heat exchange medium in its conditioned state into said heat exchange medium in its liquid state by means of the motive force of said heat exchange medium in its liquid state flowing through said suction chamber of said venturi jet mean;

recovering said superheat and said latent heat from said heat exchange medium by means of said entraining and said compressing within said venturi jet means;

expelling said heat exchange medium and said heat exchange medium entrained therein through a discharge means into said heat exchange medium in its liquid state contained in said heat exchanger means, for the transfer of said heat exchange medium in its liquid state of the superheat and latent heat recovered in said venturi jet means;

conducting said recovered heat from said heat exchange medium in said remote heat exchanger means through a second heat exchange means to another heat exchange medium, for transmission and use of said recovered heat;

pumping a portion of said heat exchange medium in its liquid state from said heat exchange medium in said liquid state contained in said remote heat exchanger means into said solar evaporation means for replenishment of the amount of said heat exchange medium in its liquid state within said solar evaporation means; and regulating said amount of heat exchange medium in its liquid state is contained within said solar evaporation means by sensing whether said heat exchange medium in its liquid state rises above or falls below a predetermined liquid level and thereby controlling the pumping of said heat exchange medium in its liquid state into said solar evaporation means and into said venturi jet means within said remote heat exchanger means.

3. The method of claim 2 further including the added steps of:

pumping said heat exchange medium in its liquid state contained within said remote heat exchanger means through an expansion valve into a cooling evaporator means for cooling a desired area and for adding latent heat to said heat exchange medium;

conducting heat from said desired area into said cooling evaporator for evaporation therein of said heat exchange medium from its liquid state to its gaseous state;

passing said heat exchange medium in its gaseous state at a relatively high velocity through a cooling venturi jet means within said remote heat exchanger means for providing motive force to said cooling venturi jet means and for providing a low-pressure area at a vacuum inlet of said cooling venturi jet means; and drawing said heat-exchange medium in its gaseous state from said cooling evaporator by said low-pressure area into said vacuum inlet of said cooling venturi jet means for providing entrainment of heat exchange medium in its gaseous state from said solar evaporation means, and for providing circulation of said heat exchange medium through said cooling evaporator.

4. The method of claim 3 including the added steps of:

pumping said heat exchange medium in its liquid state from the liquid reservoir in said remote heat exchanger means through a heat exchange means for the evaporation of said heat exchange medium from its liquid state to its gaseous state; and drawing, by venturi jet means-induced suction, said heat exchange medium from said remote heat exchanger means in its gaseous state into said remote heat exchanger means by means of said low-pressure area provided by said venturi jet means, for the operation of said cooling evaporator means during periods when insufficient or no radiation is present to evaporate said liquid heat exchange medium within said solar evaporation means.

5. A latent heat cooling and heating system comprising, in combination:

at least one heat collection means having a liquid phase inlet and a gaseous phase outlet;

a heat exchange medium having a liquid phase and a gaseous phase;

a heat exchanger means for (1) recovering heat from said heat exchange medium in its gaseous state, (2) for condensing the gaseous state of the heat exchange medium to recover the latent heat stored therein; (3) for storing a quantity of liquid-heat exchange medium therein; (4) providing a cooling function with all compression occurring within the system taking place within said heat exchange means; (5) for maintaining various levels of vacuum at the gaseous phase outlets of each of said at least one heat collection means; (6) simultaneously collecting heat from both each of said at least one heat collection means and from the work input to the system; and (7) transferring the collected heat to an internal heat exchanger for transferring to one of at least an end use device and a heat storage device, said heat exchange means having at least a gaseous input means and a liquid phase outlet; and means for operatively coupling the liquid phase outlet of said heat exchange means to the inlet of said heat collection means and means for operatively coupling the gas phase outlet of said heat collector means to the gas phase input means of said heat exchange means for forming a closed loop system.

6. The system of claim 5 wherein said heat exchange means includes passive element means responsive to the kinetic energy to the gaseous phase of the heat exchange medium from said heat collection means for effecting a compression function and creating a relative vacuum for preventing heat loss and increasing system efficiency.

7. The system of claim 6 further including pump means for conveying the liquid phase of said heat exchange medium from the liquid phase output of said heat exchange means to the liquid phase input of said heat collection means and to said passive element means.

8. The system of claim 7 wherein said passive element means includes a heating venturi jet means having a motive inlet, a suction inlet, and a discharge outlet, said system further including means for operatively coupling the liquid phase outlet of said remote heat exchanger means to the motive inlet of said heating venturi jet means for generating the motive force required to operate said heating venturi jet means and for transferring the heat added by the work of said pump means to said heat exchange medium.

9. The latent heat cooling and heating system of claim 8 wherein said heating venturi jet means comprises:

suction chamber means for drawing in said gaseous heat exchange medium, said suction chamber means having said suction inlet;

nozzle means operatively to suction chamber means for the entraining of said gaseous heat exchange medium by the motive force of a high-velocity stream of said heat exchange medium in its liquid state, said nozzle means having said motive inlet; and discharge means including a discharge outlet for the expulsion of high-velocity stream of said liquid phase heat exchange medium and of said gaseous heat exchange medium and entrained therein into the heat exchange medium in its liquid state contained within said heat exchanger tank means.

10. The system of claim 8 wherein said heat exchange means includes:
  a heat exchange tank means;
  a lower liquid phase portion of said tank means for receiving a quantity of liquid phase heat exchange medium therein;
  an upper gas phase portion of said tank for containing a quantity of gaseous phase medium exchange medium therein;
  a first heat exchange coil means operatively disposed within the lower liquid phase portion of said tank means;
  means for operatively coupling one end of said first heat exchange coil means to said gaseous phase input means of said heat exchanger means;
  means for operatively coupling the opposite end of said first heat exchange coil means to said suction inlet of said heating venturi jet means for entraining said gas phase heat exchange medium from said gas phase outlet of said heat collection means with the liquid phase heat exchange medium from the lower liquid portion of said tank means;
  said heating venturi jet means including said discharge port for spraying the entrained gas/liquid phase mixture of heat exchange medium within the interior of said heat exchange tank means for (1) creating a continuous vacuum at the suction inlet of said heating venturi gas means, (2) transferring said vacuum through said gaseous phase inlet means and said means for operatively coupling said gaseous phase outlet of said at least one heat collection means to said gaseous phase input means of said heat exchange means for sucking the gas phase heat exchange medium out of said at least one heat collector means, for reducing heat loss, and for significantly increasing the system efficiency; (3) condensing the sprayed vapor within said heat exchange tank means such that the resulting liquid heat exchange medium contacts other components within said heat exchange tank means and performs one of the heating and cooling function therein.

11. The system of claim 10 wherein said system includes at least a second heat collection means having a liquid phase input and a gaseous phase output;
  said heat exchange means further including cooling venturi jet means operatively exposed within said heat exchange pump means and having a motive inlet, a suction inlet, and a discharge outlet, means for operatively coupling said motive inlet of said cooling venturi jet means to the gaseous phase means of said heat exchange means, means for operatively coupling the gaseous phase outlet of said at least a second heat collection means to the suction inlet of said cooling venturi jet means for drawing said gaseous phase heat exchange medium therefrom, for operating said second heat collection means under a vacuum condition to decrease heat loss and increase system efficiency, means for operatively coupling said heat exchange means liquid phase outlet to the conditioned phase input of said second heat collector means, and means for operatively coupling said discharge outlet of said cooling venturi jet means to said one end of said first heat exchange coil means for transferring the vacuum produced at the suction inlet of said heating venturi jet inlet to the discharge outlet of said cooling venturi jet means through said first heat exchange coil means, and means for operatively coupling both said one end of first heat exchange coil means and said discharge outlet of said venturi jet means to said heat exchange means gaseous phase inlet means.

12. The latent heat cooling and heating system of claim 11 wherein said cooling venturi jet means comprises:
  suction chamber means for drawing in said gaseous heat exchange medium, said suction chamber having said suction inlet;
  nozzle means operatively coupled to said suction chamber means for the entraining of said gaseous heat exchange medium by the motive force of a high-velocity stream of said heat exchange medium in its gaseous state, said nozzle means having said motive inlet; and
  discharge means including a discharge outlet with the expulsion of said high-velocity stream of said gaseous phase heat exchange medium and of the gaseous-phase heat exchange medium entrained therein for spraying into said heat exchange medium in said liquid phase contained within said heat exchange tank means.

13. The system of claim 11 wherein said gaseous phase inlet means of said heat exchange means is operatively coupled to said means for operatively coupling said gaseous phase outlet of said heat collection means and said first conduit means for operatively coupling said heat exchange gaseous phase inlet means to said motive inlet of said cooling venturi jet means, and second conduit means for operatively coupling said heat exchange gaseous phase input means to both said one end of said first heat exchange coil means and the discharge outlet of said cooling venturi jet means, and valve means for operatively selecting one of said first and second operative coupling conduits.

14. The system of claim 13 wherein said at least one of end use and storage means each include an input and an output, said second heat exchanger coil means operatively disposed in the gaseous portion of said heat exchange tank means, one end of said second heat exchange coil means being operatively coupled to a working liquid phase heat exchange medium inlet and the opposite end of said second heat exchange coil means being operatively coupled to a working liquid heat exchange medium outlet, means for operatively coupling said working liquid phase heat exchange medium inlet to the output of said at least one of end use and storage means and means for operatively coupling said working liquid phase heat exchange medium outlet to the input of said at least one of end use and storage means, said liquid heat exchange medium circulating within said second heat exchange coil means and being heated/cooled by the spray from the discharge outlet of said heating venturi jet means and by the temperature of the gas phase heat exchange medium within the gaseous phase portion of said heat exchange tank means.

15. The system of claim 14, wherein said at least one of end use and storage means includes:
an end use means having an input and an output;
a storage tank having an input and and output;
a heat exchange liquid medium stored within said storage tank;
a first storage tank heat exchange coil means operatively disposed within said storage tank and including means for operatively coupling one end of said first storage tank heat exchange coil means to the inlet of said end use means;
means for operatively coupling the opposite end of said storage tank heat exchange coil means to the outlet of said end use means for transferring collected heat toward and away from end use means.

16. The system of claim 15 wherein said storage means further includes:
a second storage tank heat exchange coil means;
means for operatively coupling one end of said second storage tank heat exchange coil means to said liquid phase outlet of said heat exchange means; and
means for operatively coupling the opposite end of second storage tank heat exchange coil means to said means for operatively coupling said gas phase outlet of said at least one heat collection means to the gas phase inlet means of heat exchange means.

17. The system of claim 16 wherein said at least one heat collection means includes a flooded solar collection panel having a first liquid phase portion and a second gaseous portion, said liquid phase inlet being operatively disposed in said liquid phase portion and said gaseous phase outlet being operatively disposed in said gaseous phase portion, the interior of said flooded solar collector panel being under a vacuum created by said suction inlet of said heating venturi jet means for lowering the boiling point of the liquid heat exchange medium contained within said flooded solar collector panel for greatly increasing the efficiency thereof.

18. The system of claim 17 wherein said at least one heat collection means further includes means for maintaining a predetermined level of liquid heat exchange medium within said flooded solar collector panel.

19. The system of claim 17 wherein said at least one heat collection means includes:
a float operatively disposed within said flooded solar collector panel for floating on said liquid heat exchange medium stored within said liquid phase portion;
a valve means responsive to the position of said float for opening and closing the liquid phase inlet of said flooded solar collector panel to maintain said predetermined level of liquid heat exchange medium therein; and
flood linkage means responsive to the position of said float for controlling the operation of said valve means.

20. The system of claim 16 further including means for operatively coupling the inlet means of said heat exchange means to the gaseous phase outlet of each of said heat collection means for maintaining a vacuum at said outlet for improving the efficiency of said heat collector means, reducing heat loss, and drawing gaseous phase heat exchange medium to the inlet means of said heat exchanger means, said pump means pumping the liquid phase medium stored within the liquid phase portion of said heat exchanger tank means to the liquid phase inlets of at least each of the heat collection means of the system.

* * * * *